(12) United States Patent
Honzek

(10) Patent No.: US 8,424,914 B2
(45) Date of Patent: Apr. 23, 2013

(54) FLUID CONTAINER

(75) Inventor: Robert Honzek, Oberthingau (DE)

(73) Assignee: AGCO GmbH, Marktoberdorf (DE)

( * ) Notice: Subject to any disclaimer, the term of this patent is extended or adjusted under 35 U.S.C. 154(b) by 149 days.

(21) Appl. No.: 12/682,134

(22) PCT Filed: Sep. 27, 2008

(86) PCT No.: PCT/EP2008/008247
§ 371 (c)(1),
(2), (4) Date: Apr. 8, 2010

(87) PCT Pub. No.: WO2009/046894
PCT Pub. Date: Apr. 16, 2009

(65) Prior Publication Data
US 2010/0206883 A1    Aug. 19, 2010

(30) Foreign Application Priority Data

Oct. 9, 2007  (DE) .......................... 10 2007 048 333

(51) Int. Cl.
*B60P 3/22*    (2006.01)
(52) U.S. Cl.
USPC ........................................................ 280/834

(58) Field of Classification Search .................. 220/562, 220/252, 812; 280/833; 137/255, 267
See application file for complete search history.

(56) References Cited

U.S. PATENT DOCUMENTS

| | | | |
|---|---|---|---|
| 6,550,811 B1 * | 4/2003 | Bennett et al. | 280/833 |
| 7,815,221 B2 * | 10/2010 | Ford | 280/835 |
| 2009/0212521 A1 * | 8/2009 | Steffens et al. | 280/124.109 |

FOREIGN PATENT DOCUMENTS

| | | |
|---|---|---|
| DE | 19605702 A1 | 8/1997 |
| DE | 202007012045 U1 | 11/2007 |
| JP | 2001012326 A | 1/2001 |
| JP | 2006232221 A | 9/2006 |

OTHER PUBLICATIONS

International Search Report for International Application No. PCT/EP2008/008247 Dated Jan. 16, 2009.

* cited by examiner

*Primary Examiner* — Tony Winner

(57) ABSTRACT

Fluid container for a motor vehicle, with a tank (10, 11) and a retaining structure (14, 14*a*), which is suitable for carrying the tanks (10, 11), characterized in that the retaining structure is designed in such a way that the tank (10, 11) is mounted on it such that it can be displaced. The tank can be displaced in such a way that access to important components is possible without complete dismantling, and, as well as this, the installation and dismantling of the tank can be designed to be easier, faster, and therefore more economical.

14 Claims, 13 Drawing Sheets

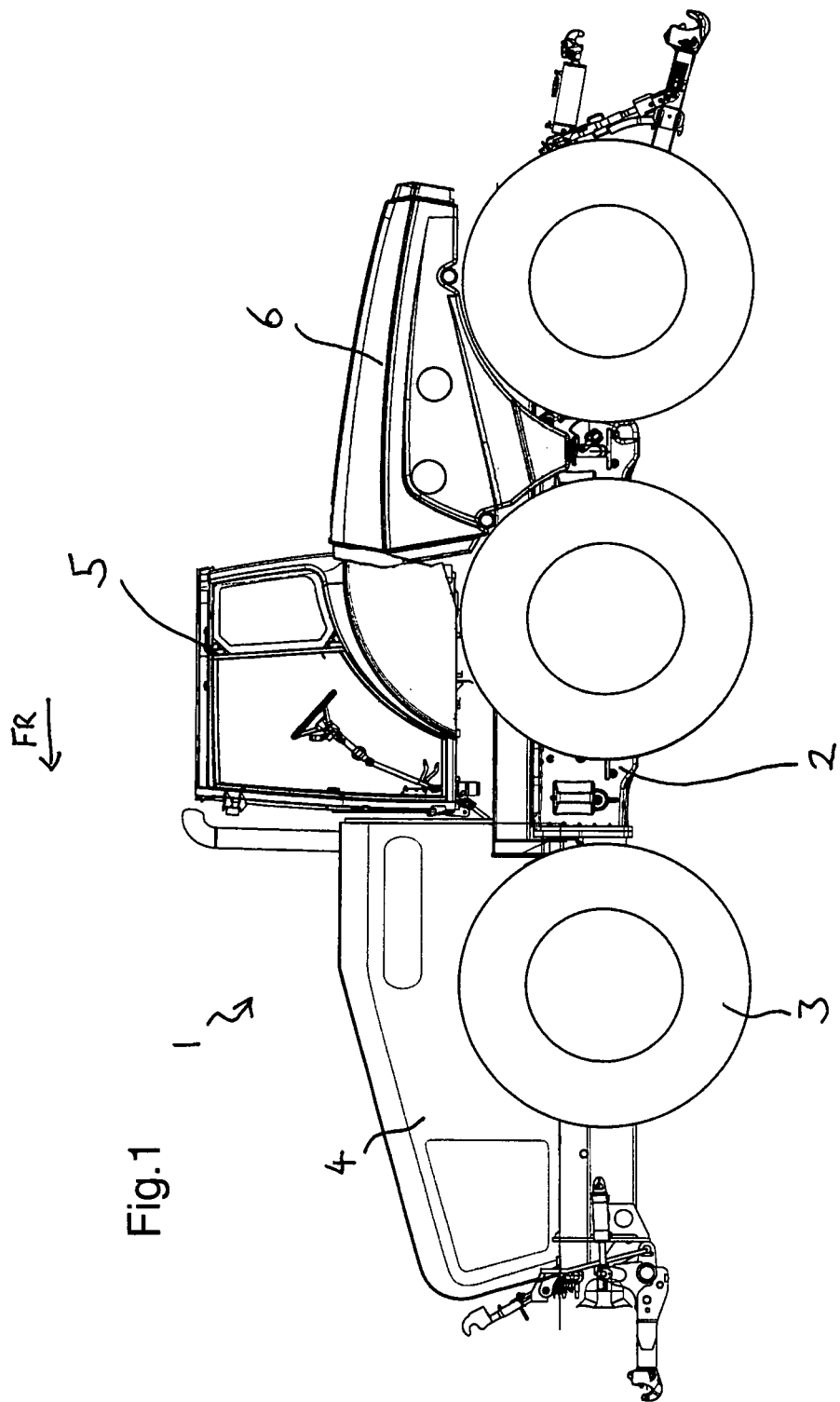

A-A

A-A

Fig. 8
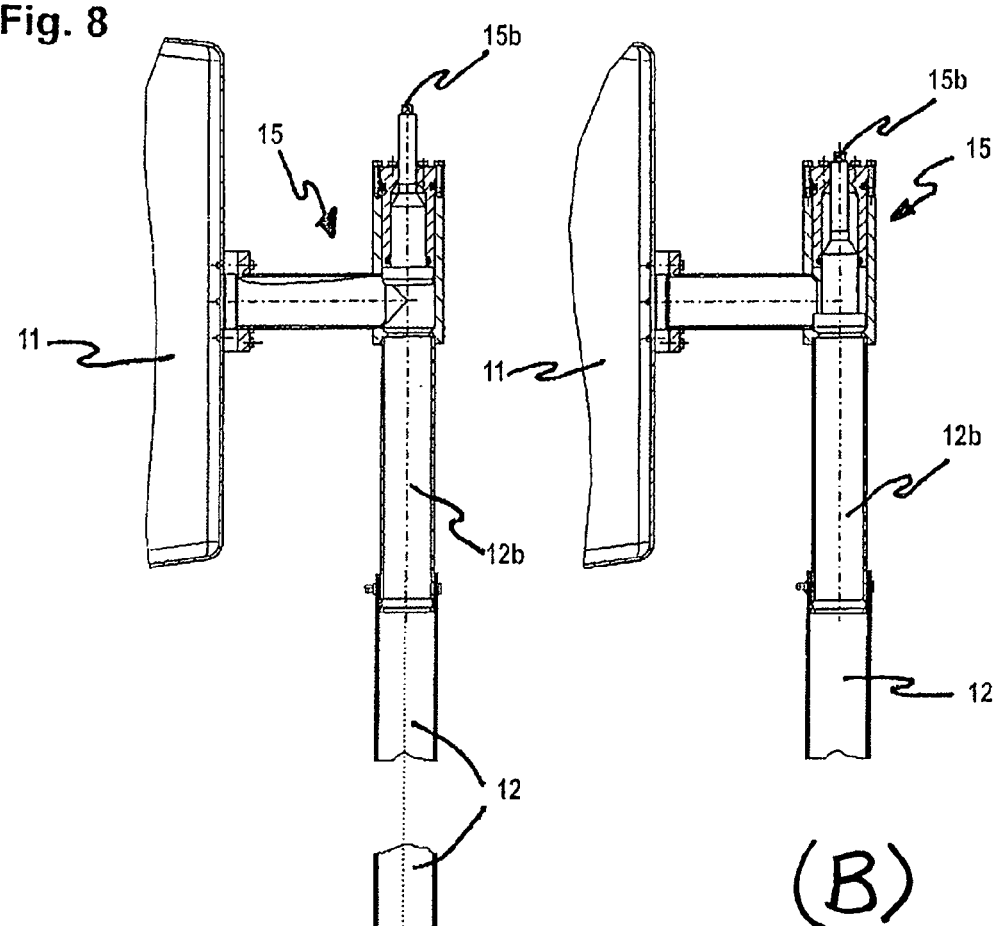
(B)
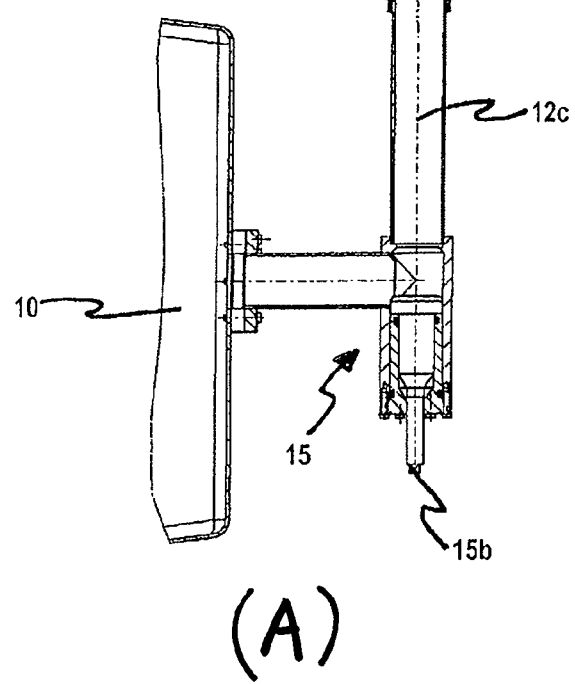
(A)

FLUID CONTAINER

FIELD OF INVENTION

The present invention relates to a container for fluid or bulk material (hereinafter only fluid is mentioned, but bulk material is intended to be included under the term), in particular, for example, to a tank for fuel for motor vehicles or for those fluids, such as liquid manure, water, fertilizer, pesticides, etc., which are used in agriculture or the construction industry or the like.

BACKGROUND OF THE INVENTION

With most vehicles with combustion engines, the maximum fuel filling quantity is dependent on the power of the engine and its consumption respectively. The rule of thumb applies that per h.p of engine capacity 2 litres of fuel can or should be carried with the vehicle. This means that for an agricultural tractor with a rating of 250 h.p, the maximum tank content, i.e. the maximum quantity of fuel which can be carried with the vehicle, should not be less than 500 litres. This guarantees that the tractor can be operated for at least 10 hours without refuelling.

Due to this large tank volume and a uniform weight distribution, the fuel tanks are in part divided into at least two volumes, which are placed on the side between the front and rear axles, right and left of the chassis, and in front of or below the driver's cab. In this situation, the fuel tanks are also used to cover installed elements in the interior of the vehicle, so that the external appearance has a more homogenous effect.

Both tanks are connected at the lowest point by a line, in order for filling level compensation to be guaranteed. This is due to the fact that in most cases the fuel removal device (fuel pump), filling device (tank nozzle), and filling level display are provided in only one of the tanks.

The tanks (fuel containers) are manufactured by what is referred to as the rotation casting method. In this situation, plastic granulate (PE, PA) is filled into a hollow form (the mould), heated, and the mould is then rotated about its three axes until the granulate melt has been distributed with an approximately constant wall thickness of 3-8 mm in the mould and has thereby formed a closed thin-walled hollow body. During the forming, insert parts such as threaded sleeves or reinforcement elements can be provided, which are then enclosed by the granulate melt and are therefore connected securely to the hollow body.

In this situation, the manufacturing costs (higher setting-up costs, longer machine times, greater defect quota) rise disproportionately with the size of the component, such that the distribution of the fuel filling volume over two or more fuel containers also offers economic advantages.

The positioning of the fuel containers in front of the components located in the interior means, however, in the event of repairs, that the fuel tanks must firstly be emptied and dismantled before these components can be repaired. Because the containers are in communication, in this situation both fuel tanks must be emptied, even if the repair only required one tank to be dismantled.

The emptying of the tank is problematic, because appropriate catchment containers with fuel quantities of more than 500 litres cannot be pushed underneath the integrated fuel tanks in order for the fuel to run out by itself. The draining of the tanks is also problematic in view of the vapours which are produced. As a result, in practice suction devices are used with which the fuel is pumped out via the filling nozzle. With large tank volumes these methods are time-intensive, increase the repair time, and therefore increase the costs.

Even if the emptied tank is perceptibly easier to handle due to its lower dead weight, it may be necessary, for example if damaged vehicles are being recovered, if the suction device is missing, for the full fuel containers to be dismantled or for the fuel simply to be drained into an intermediate tank. In this situation it is advantageous for the fuel quantity to be emptied to be as small as possible, or for it to be possible for it to be pumped across from one fuel tank into the other fuel tank which does not need to be dismantled. With many conventional fuel containers it is precisely this transfer pumping which is not possible. The tank must be dismantled with the level of fuel still in it, or the fluid must be drained.

In addition, with fuel containers with large fuel contents which extend the length of the vehicle, the movement of the fuel is problematic, since sloshing sounds result, the weight distribution of the vehicle is changed without any control, and the large masses moved cause the securing elements of the tank to be subjected to severe stress. Due to the movement of the fuel, the proper function of the fuel removal device (fuel pump) and filling level display is put at risk.

A further disadvantage of conventional tanks is that the fuel removal device (fuel pump), filling device (tank nozzle), and filling level display located in the fuel tank, as well as the required supply leads for the electrics, are perturbing from an aesthetic point of view. Hitherto, these have often been covered with a sheet metal construction.

The object of the invention is to provide a fluid container which resolves the problems indicated of elaborate installation and dismantling and, in particular, the problematic accessibility of components located in the interior in the event of repairs. Advantageously, the difficult emptying arrangements of the tanks should also be made easier.

SUMMARY OF THE INVENTION

The problem is resolved by a fluid container according to claim 1. Further embodiments of the invention are described in the sub-claims.

Due to the ability of the tank according to the invention to be displaced on a retaining structure, the tank can be displaced in such a way that access to important components is possible without complete dismantling, and, as well as this, the installation and dismantling of the tank can be designed to be easier, faster, and therefore more economical.

The retaining structure consists of carrier elements, on which the tank is mounted so as to be capable of being displaced.

An economical solution in this situation is the use of tubes for the carrier elements.

These tubes run preferably through passage apertures cast into the tank. By the use of several tubes and passage apertures, the load of the tank can be distributed uniformly. In addition to this, dismantling/installation is substantially easier than is the case, for example, with a tank securely bolted or screwed in place without carrier elements, since in the first instance securing elements which hold the tank in its operational position must be released, but the tank still bears with its passage apertures securely on the carrier elements. The carrier elements can also be arranged in such a way that they support the tank only from below, which further simplifies dismantling/installation.

The holes of the passage apertures are formed as steel tubes. The carrier elements are likewise made of steel. In this way, when the tank is moved steel slides on steel, which represents an optimum friction pairing and causes minimal wear and abrasion.

The use of two tanks offers advantages with regard to load distribution and handling in the event of repair work.

The tanks are preferably arranged above the wheels of a vehicle, thereby replacing the mudguards and contributing to the aesthetic design.

The tanks can be connected to one another by means of a connection line, as a result of which the two tanks become communicating containers. Pumping the fluid across in the event of repairs is likewise possible.

By means of a telescopic structure of the connection line the tanks can be displaced on the retaining structure without them having to be separated from one another.

Only one of the tanks is provided with a tank nozzle, which minimises the costs and effort when filling the tank.

Because both tanks are provided with a blocking device each, they can also be emptied separately from one another, or, with a half-full tank, the entire content of one tank can be pumped across into the other. Thanks to the individual blocking devices of each tank, it is therefore possible, if required, for a tank to be completely dismantled without an extra container being necessary.

The tanks have a longitudinal beading in which cable sets run. It is also provided with a cover which is intended to protect the cables from damage and dirt, and at the same time improves the appearance of the tank.

BRIEF DESCRIPTION OF THE DRAWINGS

Further features and advantageous aspects of the invention result from the description of embodiment examples on the basis of the appended drawings. The figures show:

FIG. 1 An overall view of a vehicle into which the fluid container according to the invention is integrated;

FIG. 8a A cross-sectional view of the two blocking devices in the operating position;

FIG. 8b A cross-sectional view of a blocking device in the locked position;

DESCRIPTION OF EXAMPLE EMBODIMENTS

Figure 2A:
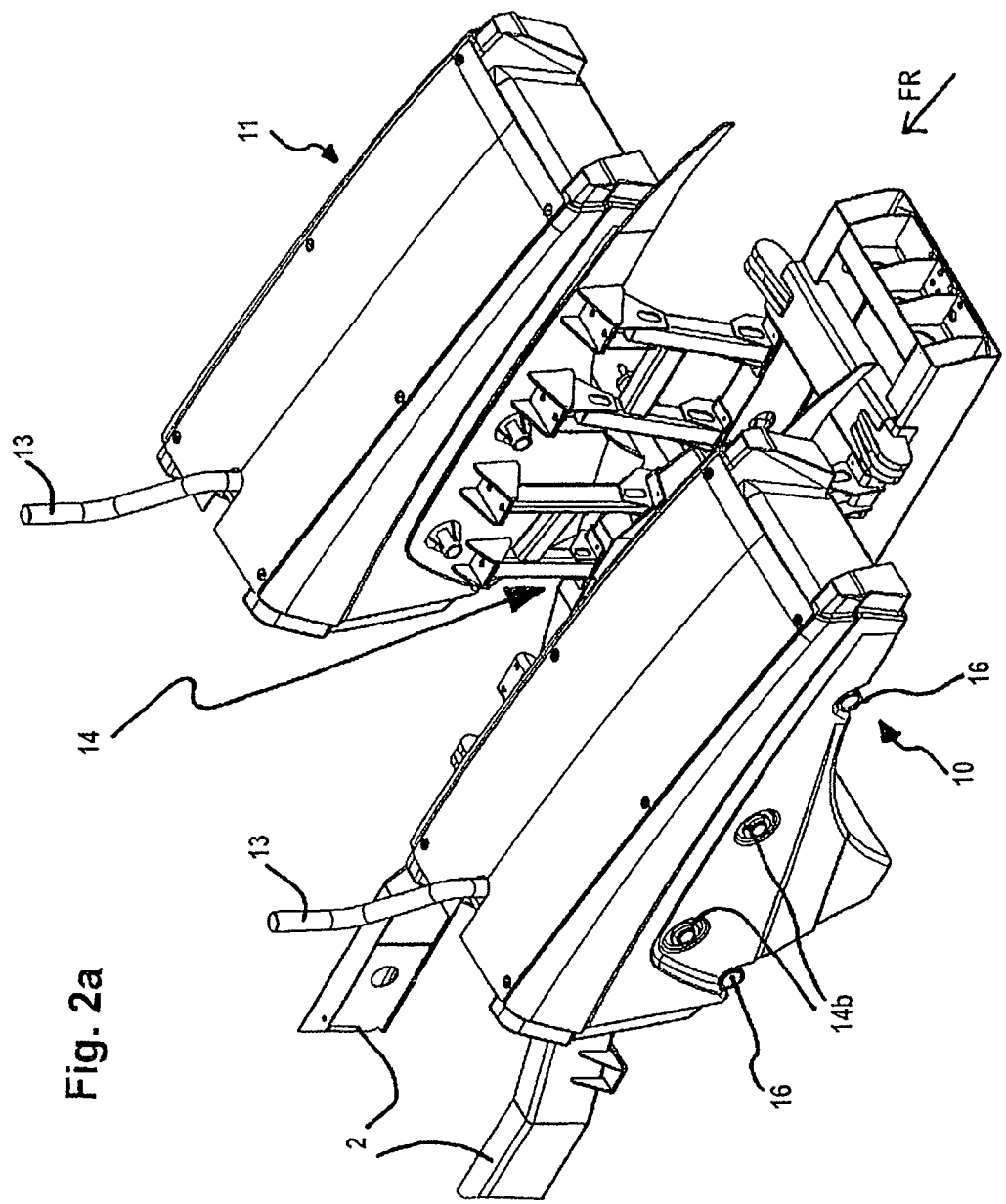
FIG. 2a A 3-D view of the fluid container, with two tanks in the locked position, the retaining construction, the connection line, and the filling nozzle.

A first embodiment of the present invention is described below.

Represented in FIG. 1 is a vehicle 1 with a chassis 2, wheels 3, an engine area 4, a cab 5, and a fluid container 6. The arrow FR designates the direction of travel of the vehicle 1. In relation to the direction of travel, the fluid container 6 in the embodiment shown is behind the cab 5.

Figure 9:
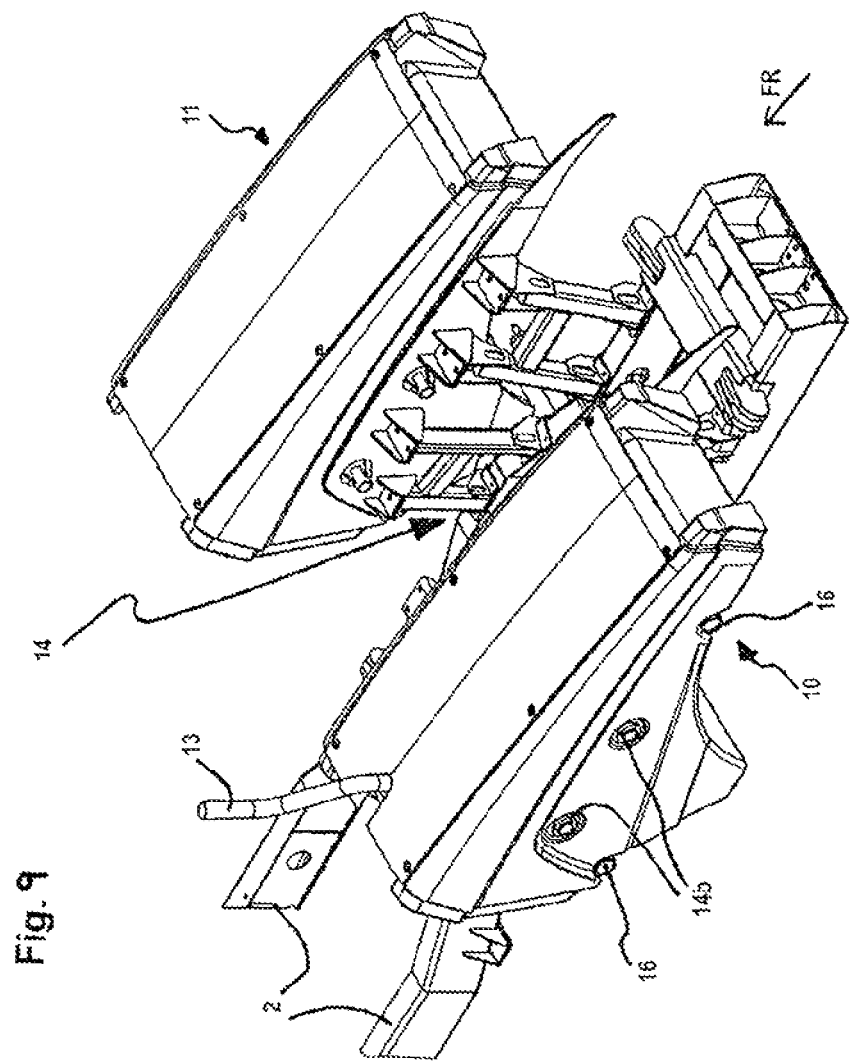
FIG. 9 An alternative embodiment of the fluid container.

FIG. 2a shows the fluid container 6 in a perspective view from the left above, with, in the direction of travel FR, a left first tank 10 and a right second tank 11. Two retaining structures 14 are provided, which in each case are connected to the chassis 2 of the vehicle 1, and are described in greater detail hereinafter in relation to FIG. 6a, b. The two retaining structures 14 each have two carrier elements 14a, on which the tanks 10, 11 can be displaced transversely to the direction of travel FR. For further stabilization of the tanks 10, 11, two support carrier elements 16 are additionally provided for each tank 10, 11. Each tank 10, 11 is provided with a filling nozzle 13. Where the tanks are connected together by a connection line, only one tank is provided with a filling nozzle 13, as shown in FIG. 9.

Figure 2B:
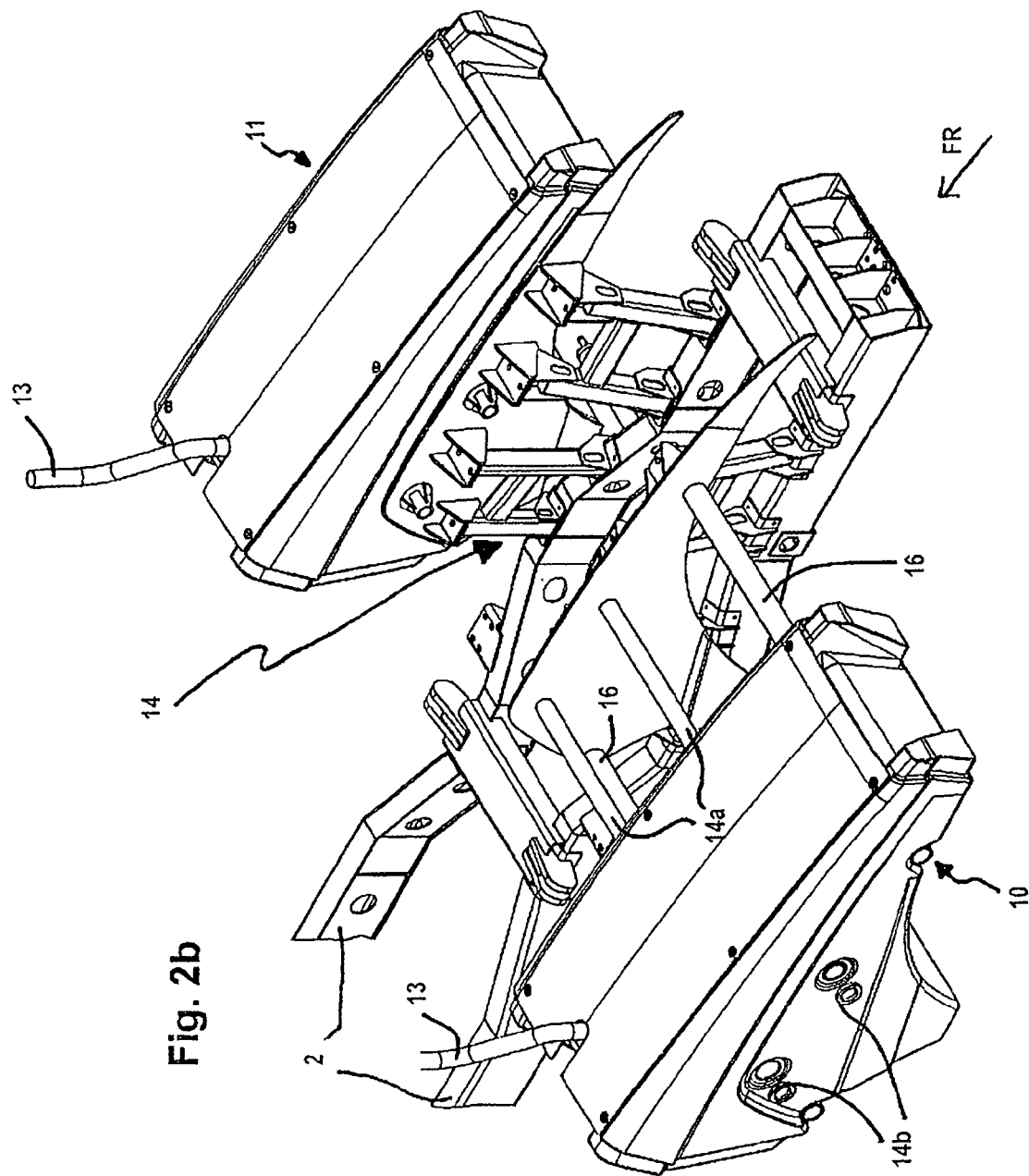
FIG. 2b A 3-D view of the fluid container, with one tank in the locked position and one in the moved-out position, the retaining structure, the connection line, and the filling nozzle.
Figure 3A:
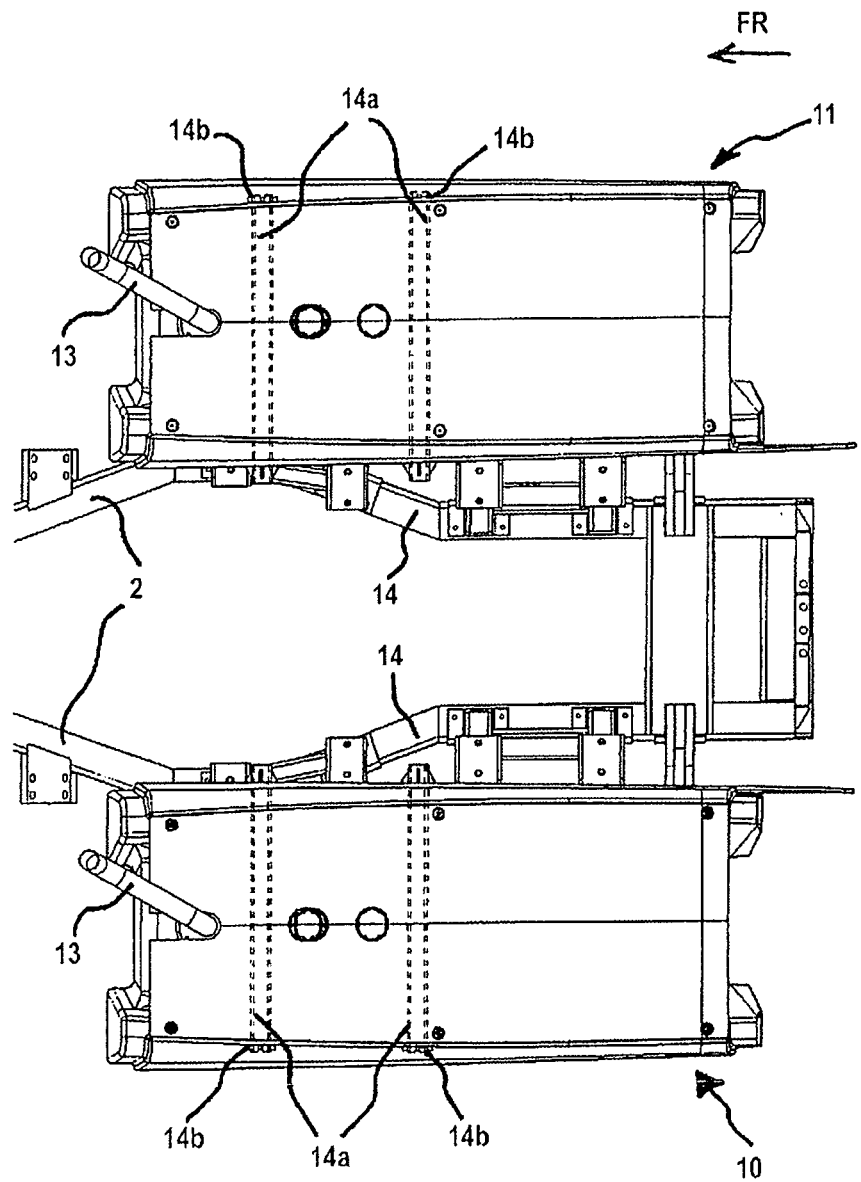
FIG. 3a A view from above of the fluid container.

FIG. 2b shows the right tank 11 in the locked position, as is also shown in FIG. 2a, and the left tank 10 in the moved-out position. The two carrier elements 14a and the two support carrier elements 16 of the left tank 10 are clearly identifiable in this moved-out position of the tank 10. FIG. 3a shows the fluid container 6 in a view from above with the first tank 10, the second tank 11, and in each case a retaining device 14. The carrier elements 14a are represented as broken lines, at the ends of which securing closure elements 14b are provided. The retaining devices 14 of the two tanks 10, 11, are in each case connected to the chassis 2 of the vehicle 1.

Figure 3B:
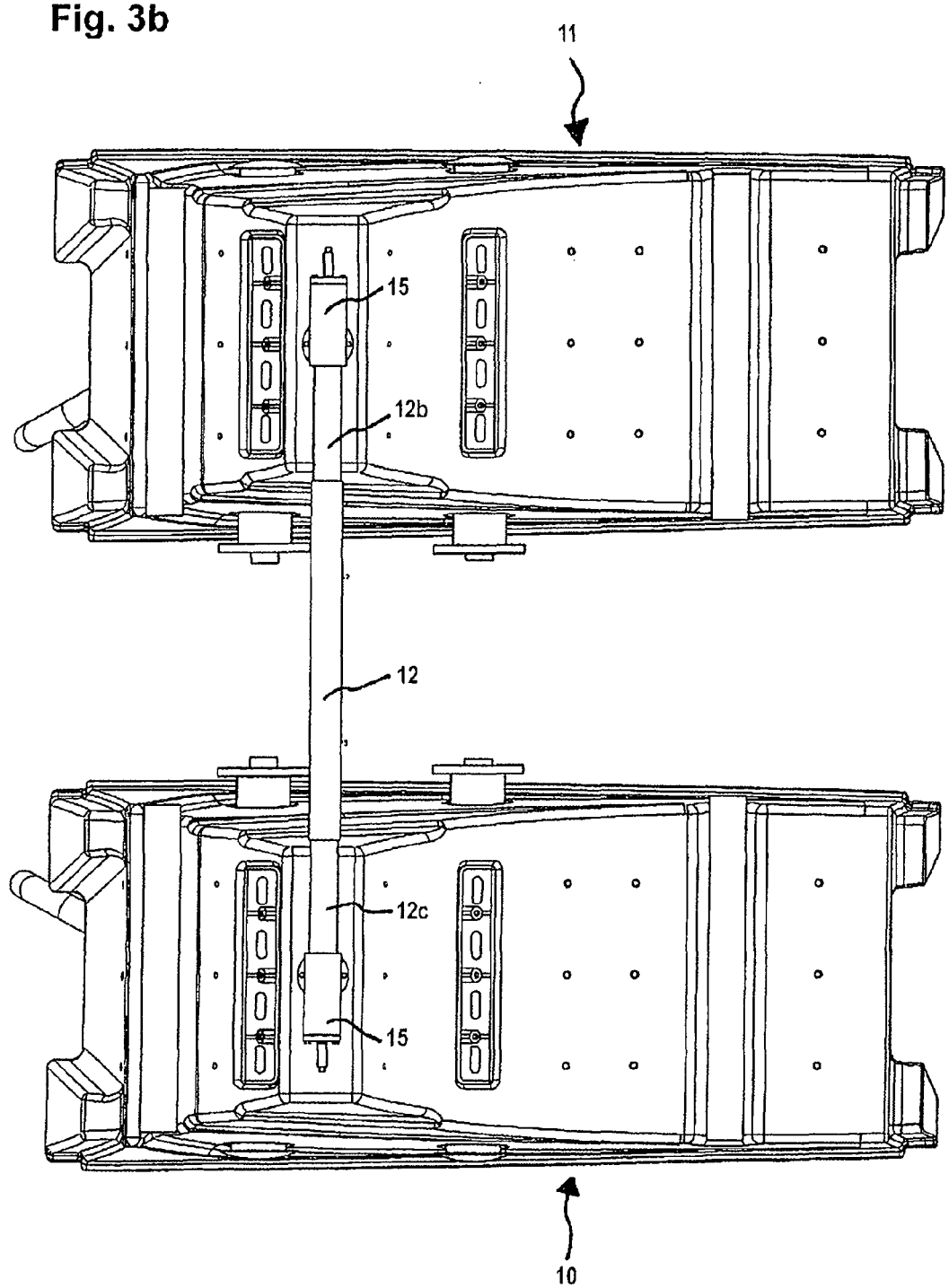
FIG. 3b A view from beneath of the fluid container.

FIG. 3b shows the fluid container 6 in a view from beneath, with the connection line 12 which connects the two tanks 10, 11, to one another. The connection line 12 is provided on both sides in each case with a connection piece (12b, 12c). The connection pieces (12b, 12c) are in turn connected to the blocking devices 15 of the tanks 10, 11. The tanks 10, 11, are therefore connected to one another in such a way that the first tank 10 and the second tank 11 form communicating containers.

Figure 4:
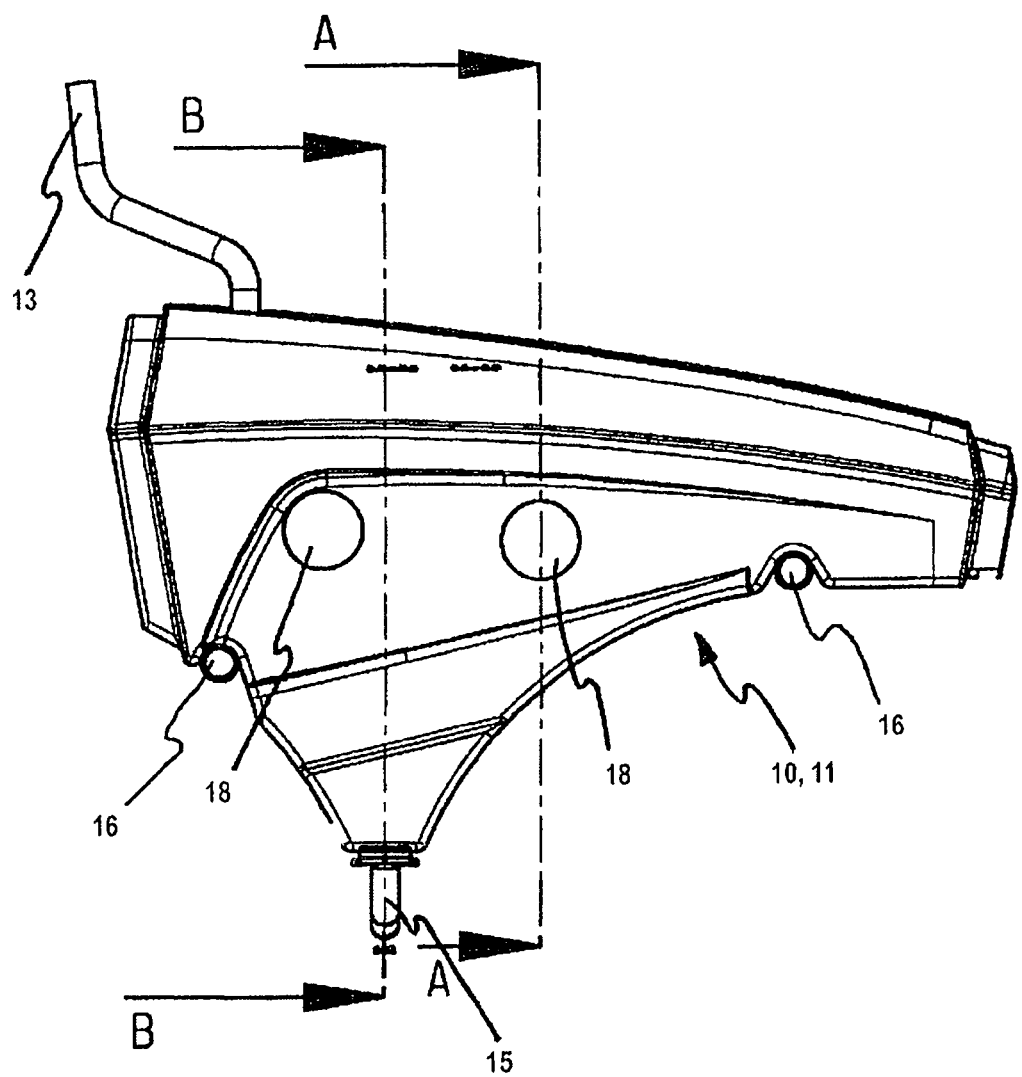
FIG. 4 A side view of a tank with sectional lines A-A and B-B.

FIG. 4 shows the tank 10, 11, in a side view with the carrier elements 14a, the filling nozzle 13 on the upper side of the tank 10, 11, and the blocking device 15 on the underside of the tank 10, 11.

Figure 5:
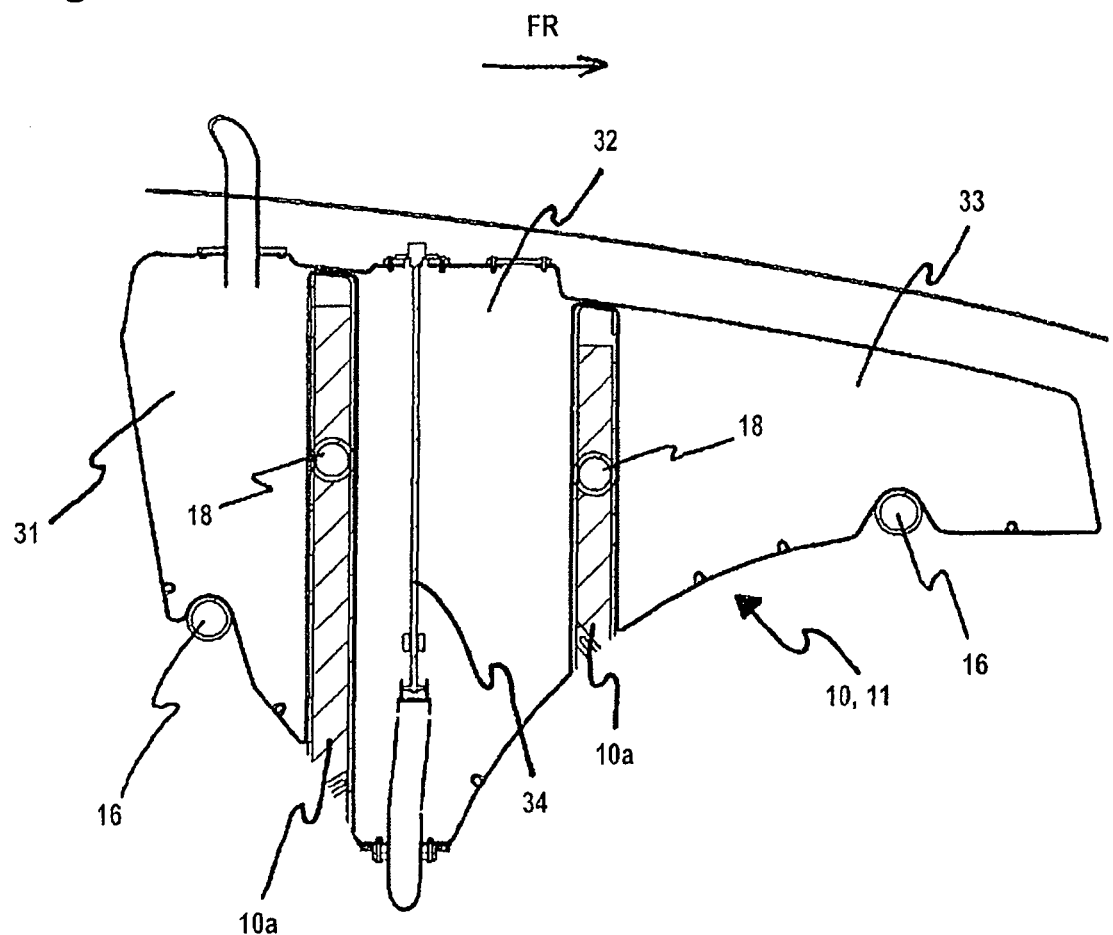
FIG. 5 A longitudinal, sectional view of a tank, with separation insert parts and float device.

FIG. 5 shows the shaping of the tank 10, 11 to reduce the movement of the fluid. The total volume of the tank 10, 11, is divided into three part volumes 31, 32 and 33 by means of separation insert parts 10a (surge walls) produced from cast aluminium, which are already moulded in as a constituent part in the rotation casting process described in the preamble to the Description. During the rotation casting, the molten plastic granulate is distributed uniformly in the casting mould during rotation about the three spatial axes. The separation insert parts 10a are in this situation completely coated in plastic and are therefore fixed in the tank 10, 11. The separation insert parts 10a as a whole are formed essentially as flat parallelepipeds, which are hollow inside. Ribbing elements 10d are provided in the hollow separation insert parts 10a (see FIG. 6a), which extend parallel to the direction of travel and serve as a reinforcement for the structure. The two separation insert parts 10a are in each case provided with a passage aperture 18, into which, after the casting, steel tubes are inserted. The design and function of these tubes is described in greater detail in FIG. 6a. The separation insert parts 10a extend in the tank 10, 11 from bottom to top continuously (see FIG. 5), but not continuously from left to right; a gap remains on the side (see FIG. 6a, b). Because the separation insert parts 10a do not run over the entire width of the tank 10, 11, all the part volumes 31, 32 and 33 are connected to one another at the lowest part, such that the filling level in all the part volumes 31, 32 and 33 are at equal height when the vehicle 1 is at rest. This is necessary in order for the filling level display device 34 in the form of a float to be able to determine the filling level correctly.

If the vehicle 1 decelerates abruptly, a form of wave formation occurs, which then, for example if the vehicle 1 brakes, impacts on the frontmost wall. In this situation, the height of the "wave crest" increases with the distance covered. As a result, the securing elements of the tank 10, 11, as well as the tanks 10, 11 themselves, are subjected to severe stress. Due to the subdividing of the tanks 10, 11 into three volumes 31, 32 and 33, the wave formation is reduced, because the fluid volume which runs up has a shorter movement path.

Figure 6A:
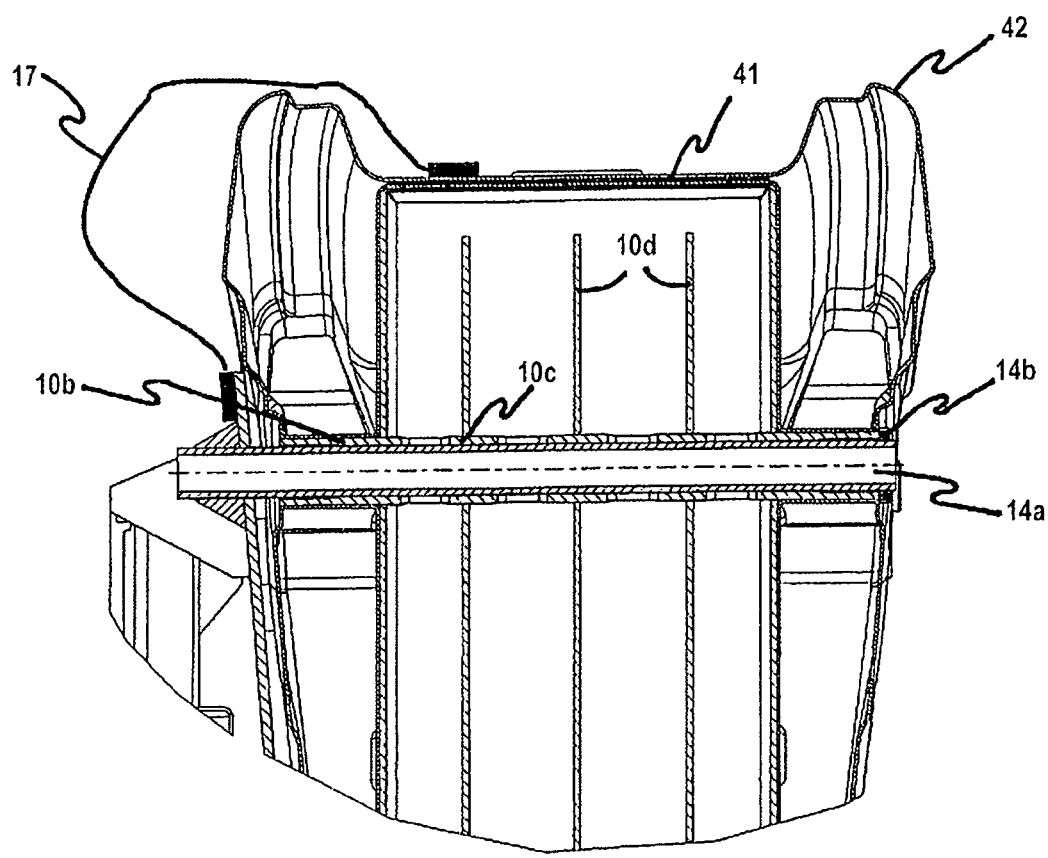
FIG. 6a A cross-sectional view at the position A-A from FIG. 4 in the locked position.

FIG. 6*a* shows the mounting of the tank 10, 11 by the carrier elements 14*a*. The mounting of the tanks 10, 11 on the tube-shaped carrier element 14*a*, in this situation is effected only on the steel tube pushed subsequently into the separation insert part 10*a*. In the embodiment example, this steel tube of the separation insert part 10*a* also extends outside the said part, essentially over the entire width of the tank 10, 11. In this way it is guaranteed that the metallic carrier elements 14*a* do not come in contact with the plastic of the tank 10, 11. If the tubular section of the separation insert part 10*a* extends only inside the said part, the diameters of the first holes 10*b* in the tank 10, 11 (plastic) should therefore be greater than the second holes 10*c* in the separation insert parts 10*a*, such that the weight of the tank 10, 11 is carried only by the separation insert parts 10*a*. In this way the risk can be avoided of the metallic carrier elements 14*a* causing abrasion with the passage apertures 18 cast into the tanks 10, 11. On the outside of the tanks 10, 11, a security lock 14*b* is screwed into the tubular carrier elements 14*a*, which locks the fuel tank in its operating position transverse to the direction of travel. Other security elements are also conceivable.

Figure 6B:
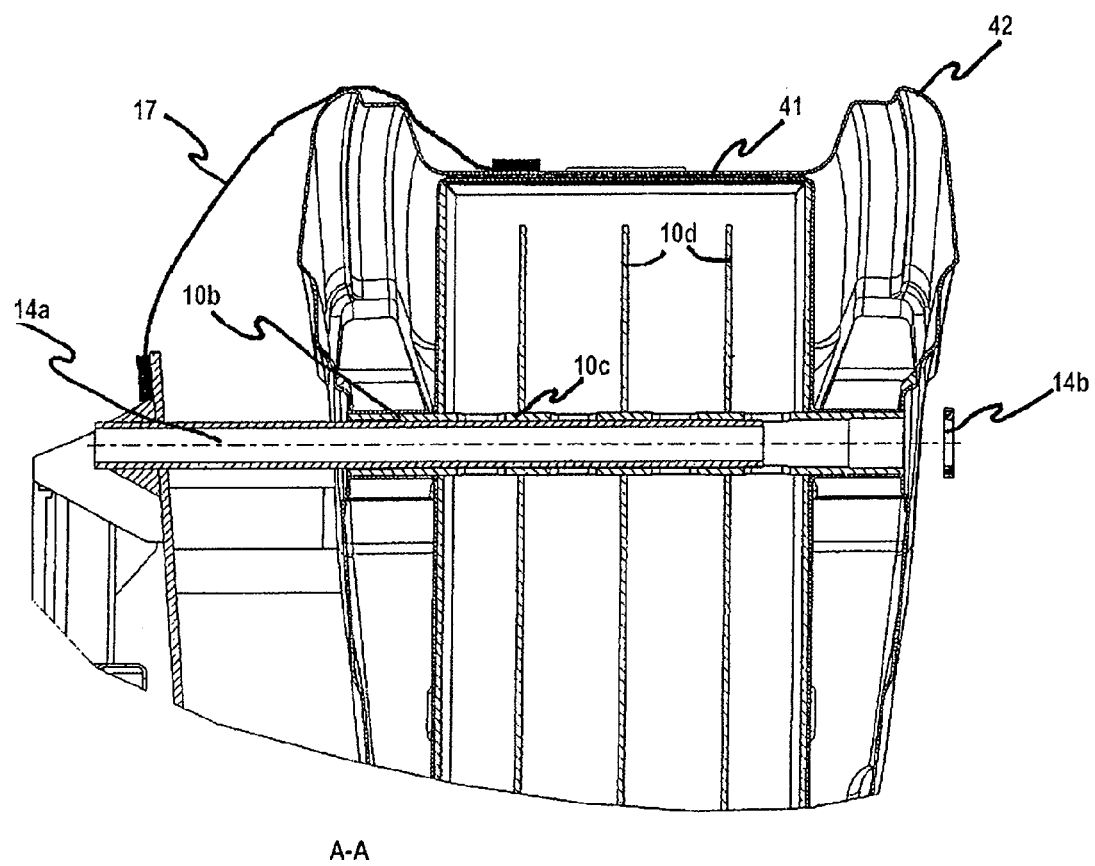
FIG. 6b A cross-sectional view at the position A-A from FIG. 4 in the moved-out position.

FIG. 6*b* shows how, after unscrewing of the security lock 14*b*, the closure of the blocking device 15, and the separation of the middle part 12*a* from the connection line 12, the individual tank 10, 11 can be drawn out transverse to the direction of travel FR, wherein the tank is still supported by the carrier element 14*a* of the retaining structure 14. In order to provide additional securing for the tank 10, 11, a catchment cable 17 is provided. The catchment cable 17 is tensioned in this position and prevents the tank 10, 11 from sliding down completely or falling off the carrier elements 14*a*. The catchment cable 17 can be removed for complete dismantling of the tanks 10, 11.

Figure 7:
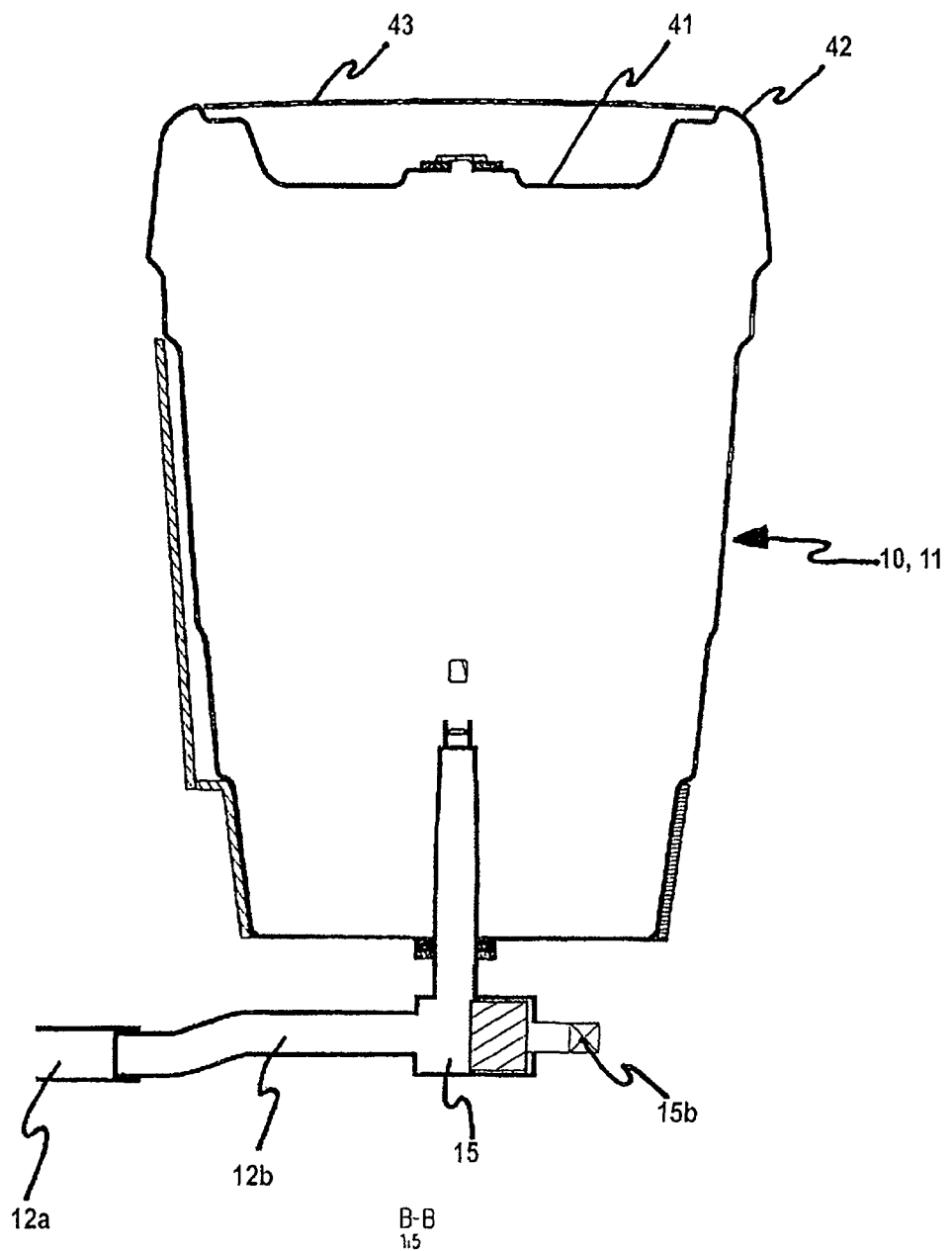
FIG. 7 A cross-sectional view at the position B-B from FIG. 4.

FIG. 7 shows the sectional view B-B from FIG. 4, wherein the connection line 12, which is composed of three connection pieces 12*a*, 12*b* and 12*c* (see FIG. 8*a*), is provided between the first tank 10 and the second tank 11. A blocking device 15 is provided in each of the two connection pieces 12*b*, 12*c*, with which the volumes of both tanks 10, 11 can be subdivided. The blocking device 15 can be designed as a stopcock (as in the embodiment example with a square fitting 15*b* for application of a tool) or as an electrical or hydraulic-pneumatic valve. When the blocking devices 15 are closed in the two connection pieces 12*b*, 12*c*, the middle piece 12*a*, which is connected with fluid tightness to the two connection pieces 12*b* and 12*c* by, for example, a crown-nut connection or a clamp connection (in the case of a hose), is separated by opening. The small residual quantity of fuel located in the middle piece 12*a* can then simply be emptied into a catchment container. The two tanks 10, 11 form two fluid containers separated from one another. Both tanks 10, 11 can be separately dismantled, together with their contents. It is also possible, however, for the fluid to be pumped via an external suction device into the remaining tank 10, 11 on the vehicle. By the use of two tanks 10, 11 the maximum amount of fuel can be halved that must be emptied, pumped across, or moved with the tank 10, 11.

In order to conceal visually from the outside mounted parts such as the filling level display device 34 and the fuel removal device (fuel pump), the geometry of which would project out of the tank volume, these are located in a beading 41, lying vertically lower down. Cable sets are also laid inside this beading. From the outside only the edge contour 42 is then visible, such that these mounted parts do not disturb the aesthetic appearance. Optionally, this beading can also be provided with covers 43, such that components lying in the beading, in particular cable sets, are better protected against the effects of the weather and damage.

FIGS. 8*a* and 8*b* show the blocking device 15. Represented in FIG. 8*a* is the operating position of the two blocking devices 15. For the dismantling of the tanks 10, 11, a piston in the blocking device 15 is moved beforehand from a first position (FIG. 8*a*) into a second position (FIG. 8*b*). In this way the fluid flow between the tank 10, 11 and the connection line 12*b*, 12*c* is interrupted.

It is also possible for the fluid container 6 to be placed in front of or below the cab 5. In this case, it is also possible to provide only one tank, which is located centrally on the vehicle. It would also be conceivable in this case, for example, for the tank to be displaced in the longitudinal direction or in any desired direction.

The tanks can accommodate any kind of fluid, such as hydraulic oil, gearbox oil, or additives for exhaust gas treatment (e.g. urea).

Figure 10:
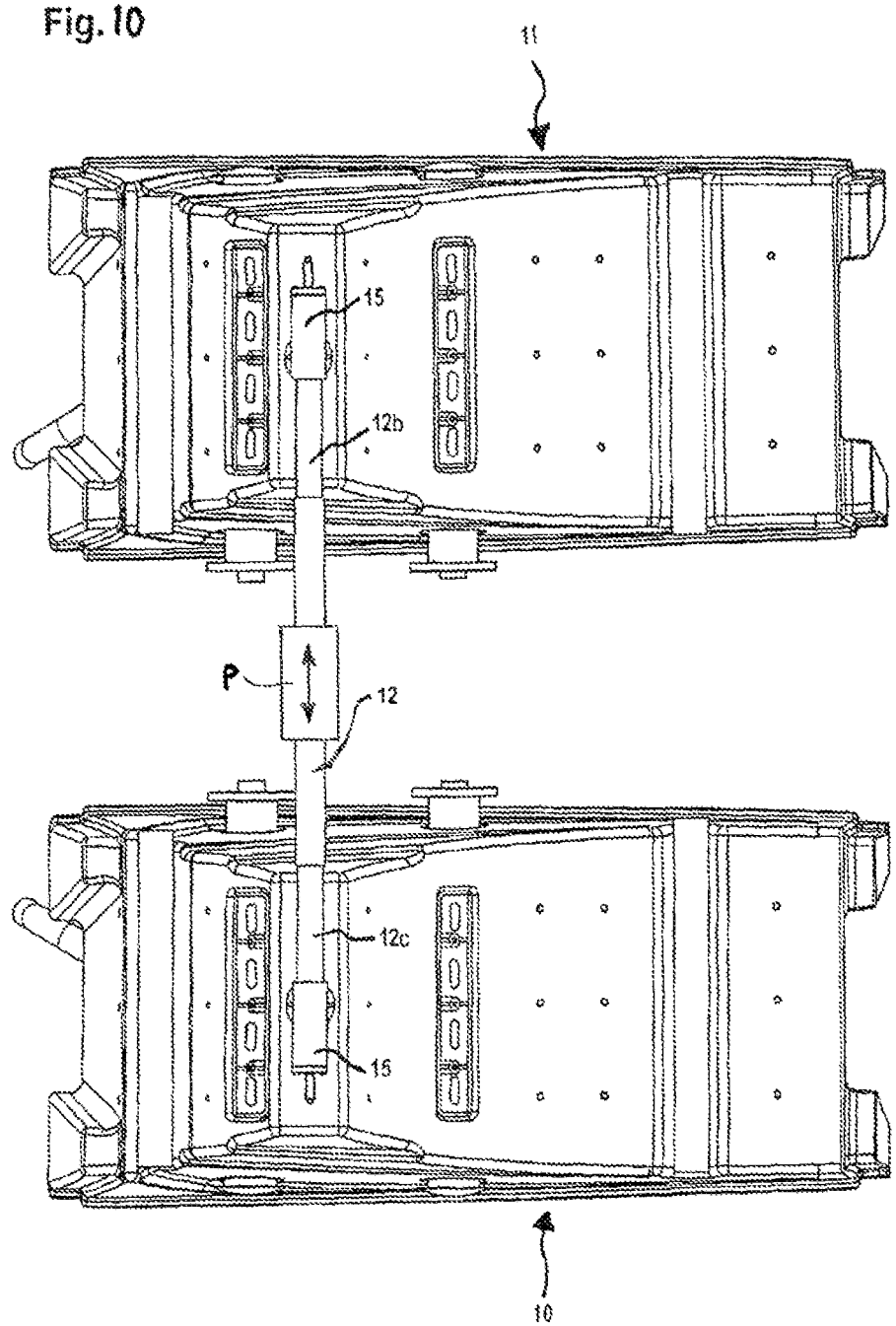
FIG. 10 An alternative connection between two tanks.

Vehicles on which the connection line 12 cannot be provided close to the lowest level of the tanks, can be equipped with additional transfer pump systems, with the aid of which the filling levels of both tanks can be equalized. This transfer pumping system could then, with a correspondingly low filling level, pump the fluid from the tank which is to be dismantled into the tank which is remaining on the vehicle, without an external transfer pumping device being necessary. One of the tanks can in this case fully accommodate the fuel from the tank which is to be dismantled from the half maximum full amount as shown by pump P in FIG. 10.

A further possible application would be a fluid container in accordance with the preceding details, wherein the tank(s) can be filled with fluids customary for the agricultural sector, such as water, liquid manure, fertilizers, pesticides, or the like.

Also conceivable would be designing the connection line 12 in telescopic fashion or as a hose with an overlength, such that, on displacement of one or both tanks, it would no longer be necessary to interrupt the connection, to activate the blocking device 15, or to drain fluid. The effort for carrying out minor repairs, for which the tanks are only displaced and do not have to be dismantled, would be further reduced by such a configuration of the connection line 12.

The invention claimed is:

1. A vehicle having a chassis (2) with a support structure on which a fluid tank (10,11) is slideable, the tank being molded from plastics material and being slideable away from the chassis on at least one tubular carrier element (14*a*) which extend into a passage aperture (18) molded into the tank, the aperture including a metal reinforcing tubular structure which is isolated from any fluid in the tank and which slides on the tubular carrier element (14*a*) carried by the chassis (2) to allow the tank to slide away from the chassis to give access to components of the vehicle inboard of the tank, the tank includes at least one reinforcing insert structure (10*a*) which is molded into the tank so as not to come into contact with any fluid in the tank and the metal reinforcing tubular structure is inserted into the passage aperture (18) through openings provided in the metal reinforcing insert structure (10*a*).

2. A vehicle according to claim 1 wherein the at least one metal reinforcing insert structure (10*a*) extends across the tank to provide a wave reducing barrier which divides the tank into interconnected part volumes.

3. A vehicle according to claim 1 wherein the tank (10,11) is also supported for sliding movement relative to the chassis on one or more additional support structures (16) which slide in cut-outs molded into the underside of the tank.

4. A vehicle according to claim 1 further comprising a second fluid tank (10, 11) slideably mounted on said support structure, said second tank being molded from plastics material and being slideable away from the chassis on at least one tubular carrier element (14*a*) which extend into a passage aperture (18) molded into said second tank, the aperture including a metal reinforcing tubular structure which is isolated from any fluid in said second tank and which slides on the tubular carrier element (14*a*) carried by the chassis (2) to allow said second tank to slide away from the chassis to give access to components of the vehicle inboard of said second tank, said second tank including at least one reinforcing insert structure (10*a*) which is molded into said second tank so as not to come into contact with any fluid in said second tank and the metal reinforcing tubular structure is inserted into the passage aperture (18) through openings provided in the metal reinforcing insert structure (10*a*), wherein said fluid tank and said second tank are interconnected with each other by a connection line (12).

5. A vehicle according to claim 4 wherein the connection line has a telescopic structure.

6. A vehicle according to claim 4 wherein said fluid tank and said second tank (10,11) are arranged above the wheels (3) of the vehicle (1), and replace the mudguards.

7. A vehicle according to claim 4 wherein only one of said fluid tank and said second tank (10,11) has a filling nozzle (13).

8. A vehicle according to claim 4 wherein said fluid tank and said second tank (10,11) each have a blocking device (15), by which the tanks (10,11) can in each case be emptied separately from one another.

9. A vehicle (1) according to claim 4 wherein a transfer pump device is provided for transferring fluid from one tank to the other tank.

10. A vehicle according to claim 1 wherein the tank (10,11) has a beading (41) running longitudinally.

11. A vehicle according to claim 10, wherein the beading (41) running longitudinally is provided with a covering (43).

12. A vehicle (1) having a chassis (2) and at least two tanks (10,11) moveably mounted thereto, the tanks being connected to one another by means of a connection line (12) which includes a telescopic structure to allow the tanks to move relative to each other.

13. A vehicle according to claim 4 wherein a blocking device (15) is provided for each tank (10,11).

14. A vehicle (1) according to claim 12 wherein a transfer pump device is provided for transferring fluid from one tank to the other tank.

* * * * *